ABSTRACT OF THE DISCLOSURE

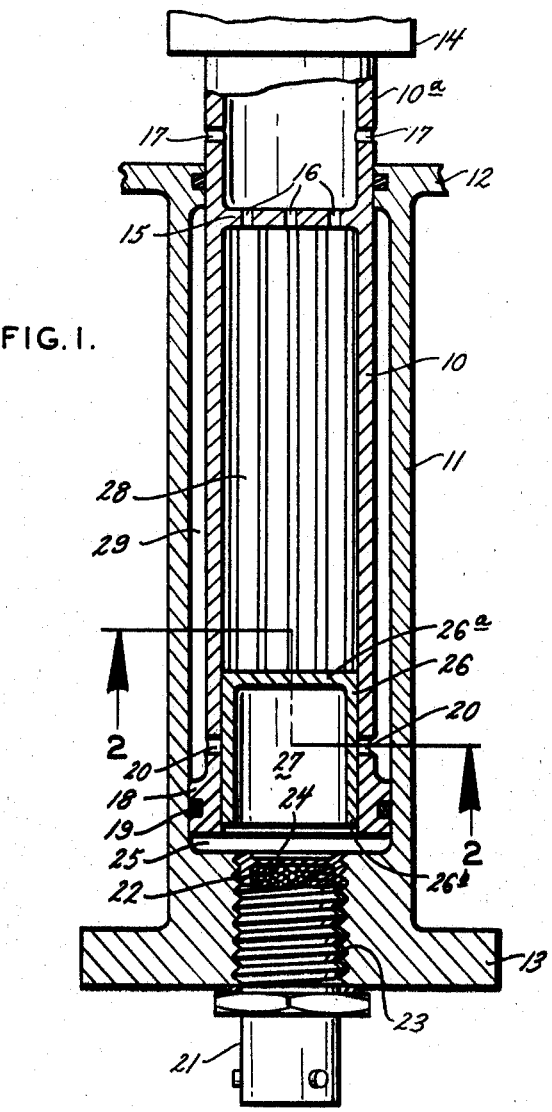
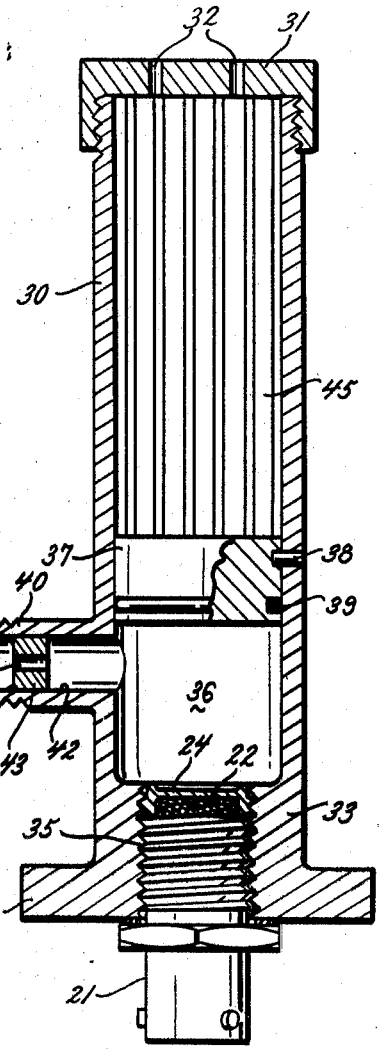
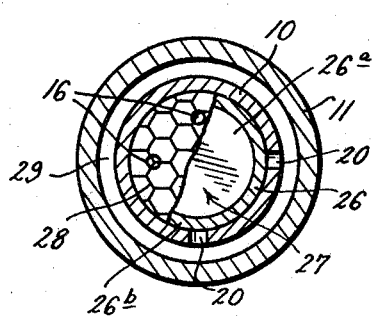
FIG. 1.
FIG. 3.
FIG. 2.
INVENTORS
JAMES HARVEY HOSMAN, JR.
MORRY LEON SCHIMMEL
BY Gravely, Lieder & Woodruff
ATTORNEYS 3,484,846
PRESSURE AND LOAD CONTROL FOR
PROPELLANT ACTUATED DEVICE
James Harvey Hosman, Jr., St. Charles County, and Morry Leon Schimmel, University City, Mo., assignors to McDonnell Douglas Corporation, St. Louis, Mo., a corporation of Maryland
Filed Nov. 1, 1967, Ser. No. 679,837
Int. Cl. F01b 29/08
U.S. Cl. 60—26.1        5 Claims

Propellant actuated device for effecting separation of two bodies, or for delivering combustion gas at controlled pressure for operating devices or for inflation purposes, the device incorporating means to control the gas pressure and attendant stress so that a relatively steady state of separation force or gas delivery is obtained at a value that can be predetermined within relatively close limits.

---

This invention pertains to a device for separating two bodies with a propellant actuated device, or for the generation of a gas flow under controlled conditions and is more particularly concerned with means to control the level of pressure delivered to the bodies to be separated or to control the gas flow within predetermined limits.

In many instances where propellant actuated devices are used to separate two bodies, or to deliver a flow of working gas, the environment for the application of the pressure has to be designed for peak stress values due to the rapid rise in pressure at initiation. It is also a problem to provide a propellant charge that will perform satisfactorily over a wide range of environmental temperatures. In the present invention the generation of power through combustion of propellant is accomplished by means that controls the pressure of the gas within predetermined limits and through a structure that is simple and economical, and one that can be sized to suit the conditions to be met.

It is an object of this invention to provide a propellant actuated device that will overcome problems heretofore exitsing where two bodies are to be separated at a predetermined velocity or rate of separation.

Another object of this invention is to provide a propellant actuated device that is simple in construction and highly efficient in delivering thrust from a flow of gas under controlled pressure of just the correct and desired value on bodies to be separated or for doing work where peak pressure is to be avoided.

A further object of the invention is to provide a device that uses crushable honeycomb means to control the delivery of force to the purpose desired, or for separating two bodies or for moving one body relative to another.

Other objects of this invention will be set forth in the following specification pertaining to certain preferred embodiments of the propellant actuated device, and attention will be directed to the several views in the drawings, wherein:

FIG. 1 is a longitudinal sectional view of one form of the present device;

FIG. 2 is a transverse sectional view at line 2—2 in FIG. 1; and

FIG. 3 is a view similar to FIG. 1 but illustrating a variant thereof.

Referring now to the several views in the drawings, and particularly FIGS. 1 and 2, there is shown a propellant actuated device comprising an elongated tubular housing 10 which is movably mounted in an elongated outer barrel 11. The barrel 11 may be connected to a supporting structure which is only partially shown at a mounting flange 12 and a base flange 13. The housing 10 has a portion 10a which extends through the flange 12 for sliding movement and is suitably connected to a body or other object 14 requiring movement. As will be described presently, the housing 10 has an end wall 15 formed with a plurality of bleed holes 16, and beyond the end wall 15 the housing portion 10a is formed with a plurality of bleed holes 17 that open to the surrounding space. The opposite end of housing 10 from the end wall 15 is formed with an enlarged base 18 carrying a suitable seal ring 19 so that the base 18 acts as a piston and is slidable in the bore of the outer barrel 11. Spaced a suitable distance above the base 18 of the housing 10 there are formed a plurality of gas bleed holes 20.

Associated with the structure above described there is a cartridge case 21 of well known construction containing a propellant charge 22. The body portion of the case 21 is threadedly mounted in a suitable bore 23 in the base flange 13 of the outer barrel structure 11. The propellant charge 22 is retained in the case 21 by a rupturable wall 24 which is open to the interior space 25 of the outer barrel 11 adjacent the enlarged piston like base 18 of the housing 10. The housing 10 is provided with a suitable piston 26 slideably mounted therein and initially positioned adjacent the base 18 so as to cover the gas bleed holes 20 and form a continuation of the interior space 25 in the outer barrel 11. Therefore, the space 25 is barrel 11 and the interior space 27 in the piston 26 form a propellant gas receiving chamber for receiving the combustion gas when the cartridge 21 is initiated.

One of the important purposes for the present invention is to be able to control the pressure generated by the cartridge charge 22 in such a way that unnecessarily high pressures can be avoided and a reliably steady delivery of the energy of the propellant charge can be realized such that maximum useful work will result from the energy in the propellant charge 22 being delivery at relatively constant pressure, such as in FIG. 1, by relative sliding movement between the housing 10 and the outer barrel 11. The good effects desired are accomplished in the structure shown in FIG. 1 by mounting a precrushed honeycomb unit 28 in the housing 10 such that it abuts the outer wall 15 and abuts the head 26a of the piston 26. The honeycomb unit 28 is trapped between two relatively movable walls, but there is no trapping of air or gasses in the honeycomb spaces due to the formation of bleed holes 16 in the wall and the communication provided between the outside atmosphere and bleed holes 17 in the housing portion 10a. Thus, the energy of the propellant charge 22 is delivered to the piston 26 and in turn to the precut and precrushed honeycomb unit 28 which is of a character that crushes or collapses at a substantially constant pressure until the unit 28 becomes a solid column at which point the collapsing effect of the unit 28 bottoms out on the wall 15. During the initial application of pressure on piston 26 it is appreciated that the propellant gas bleed holes 20 are covered by the piston skirt 26b, but after a very short interval of time the bleed holes 20 are uncovered and a portion of the gas bleeds off into an annular pressurization chamber 29. The rate of bleed off is determined by the size and number of orifices provided.

The operation of the assembly shown in FIGS. 1 and 2 more particularly involves the combustion of the propellant charge 22 in the interior of the housing 10 which pressurizes the communicating interior spaces 25 and 27. Since the piston 26 is initially held in position by the precrushed honeycomb unit 28, the housing 10, the precrushed unit 28 and piston 26 react as a unit plunger assembly movable in the outer barrel 11. The propellant gas pressure therefore acts to drive the assembly of parts outwardly of the mounting flange 12. The combustion of the propellent charge would normally result in a very high initial rise in the pressure were it not for the provision of the internal piston 26 and the honeycomb unit 28 in the assembly. Because of the controlling action of the precrushed honeycomb 28 on the piston 26 the propellant gas pressure is closely regulated. A portion of propellant energy is utilized to further crush the honeycomb unit 28 and to supply a portion of the gas pressure to the annular chamber 29 which then acts as a snubbing fluid on the piston base 18 sliding in the outer barrel 11. As a consequence of the relatively constant force at which honeycomb unit 28 crushes it is possible to relatively precisely control the pressure that can be usefully delivered to move the body 14 over a given period of time. Variations in the delivered pressure can be obtained by utilizing different crush strength honeycomb units 28.

It has been heretofore disclosed in U.S. Patent No. 3,263,489, issued Aug. 2, 1966, that it is possible to obtain precrushed honeycomb units having deformable structures that will deform under various applied pressures and at a relatively uniform rate. The honeycomb material, when taken from selected uniform stock and cut to predetermined size, is first subjected to a precrushing treatment so as to overcome the initial peak or high resistance of the honeycomb structure to crushing. In other words, without precrushing the honeycomb units 28 the gas charge would deliver initially an extremely high peak of applied pressure which would be required to start the crushing action. Thereafter the crushing of the unit would absorb the force applied to the piston 26 at a more or less uniform rate during the time interval of the applied pressure and before the crushed honeycomb unit 28 bottomed out against the outer end wall 15. Therefore, precrushing, as suggested in the above mentioned Patent 3,263,489, is essential in order to avoid excessively heavy or massive structures and to obtain the good effects desired by the present improvement.

Turning now to FIG. 3, there is shown a gas generator device which includes a housing 30 having a closure 31 at one end, the closure being formed with bleed holes 32 open to the ambient space. The opposite end of the housing is formed with a mounting base 33 having the flange 34 by which it is attached to a supporting structure (not necessary to show). The base is formed with a threaded bore 35 to receive the catridge case 21 in which the charge 22 is retained by a rupturable end wall 24. The cartridge receiving bore 35 opens to a chamber 36 within the housing 30. The chamber 36 is initially separated from the housing interior by a piston 37 which is held in operating position by a suitable shear pin 38 extending through the wall of the housing 30 and into the body of the piston 37. A seal ring 39 is carried in a groove formed in the piston skirt.

It further appears in FIG. 3 that the housing 30 is provided with a side boss 40 opening into the chamber 36, the boss having its outer end provided with threads 41 by which a gas delivery conduit (not shown) may be attached. The boss 40 has a bore 42 within which is fitted a suitable plug 43 having a pre-selected orifice or passage 44. In addition, the housing 30 carries a precrushed honeycomb unit 45 between the closure 31 and piston 37. The unit 45 has characateristics heretofore described for the unit 28 in FIG. 1 such that it will crush at a desired pressure when the piston 37 is actuated by the propellant charge 22.

The device of FIG. 3 is operated upon firing of the cartridge 21, and the combustion of the propellant charge 22 in the chamber 36. Upon firing the gas pressure causes the piston 37 to shear the pin 38 and begin crushing the honeycomb unit 45, and this permits the piston to enlarge the chamber 36 such that a flow of gas under a desired pressure will occur at the orifice plug 43. It is, of course, appreciated that the orifice passage 44 will pass the gas charge at a predetermined rate that is desired. During the crushing of the unit 45 there will be no resistance from trapped air as the housing is evacuated by the bleed holes 32 in the closure. Thus the crushing of unit 45 will regulate the gas pressure in chamber 36 within narrow limits since the unit 45 possesses substantially linear crushing characteristics, and peak pressure reactions are avoided.

The device of FIG. 3 makes it possible to provide a source of gas flow through the orifice plug 43 at a pressure which is closely controlled by the crushed strength characteristic of the honeycomb unit 45. The precrushed honeycomb unit 45 may be selected from any one of a number of such units having different ranges of crush characteristics that will yield a flow of gas under pressure that will be substantially uniform throughout the length of the housing 30 that is available for crushing the unit before it bottoms out against the closure 31. The precrushing of the unit 45, as has been pointed out above, eliminates the initial compressive effort by the piston 37 to overcome the static resistance. Therefore, a precrushed honeycomb unit will crush at a relative uniform pressure until the bottom-out point is reached. In units that have been tested approximately 75% of the original length of the honeycomb unit 45 was found available for controlling the pressure delivered. Furthermore, a device of the type shown in FIG. 3 does not have to be designed for what would otherwise be a maximum resistance necessary to utilize a unprecrushed honeycomb unit, or in other words, a precrushed unit can be utilized in a device that has a minimum of structure and weight. Various honeycomb units may be selected for the purpose of delivering a flow of gas under a predetermined pressure value.

The flow of gas through the boss 40 may be delivered to any one of a number of instrumentalities or devices that would otherwise be required to have a pressurized gas bottle equipped with the necessary regulators and piping. Applications might include pyrotechnic gyros used in missiles and for supplying inflatable devices such as flotation collars, life rafts and protective inflatable equipment.

It is evident from the structure disclosed in FIG. 3 that a portion of the generated gas charge is used to actuate the crushing piston 37, thereby making available the excess of the gas volume for flow through the boss 40. Thus, not all of the gas charge expends its energy on the piston 37, but the piston 37 in crushing the honeycomb unit 45 enlarges the chamber 36 at a rate that will control the delivery of gas under pressure through the boss 40 within very narrow limits. The structure in FIG. 1 operates in a like manner, that is to say, a portion of the gas charge is delivered to the piston 26 and is used to crush the honeycomb unit 28. The remainder of the energy in the gas charge is delivered at a controlled rate to effect relative movement of the housing 10 outwardly of the barrel 11. The result is that the housing 10 is bodily displaced by the gas charge and a portion of the gas charge is utilized to control the rate of the displacement of the housing 10 by flowing through the bleed holes 20 into the annular pressurization chamber 29 where it is used to oppose the movement of the piston base 18 of the housing 10 in the barrel 11. The structure of FIGS. 1 and 3 are essentially the same, except that the usable energy from the pressurized gas charge is applied in FIG. 1 to control within very narrow limits the bodily displacement of the housing 10, and in the structure of FIG. 3 the flow of gas under pressure is utilized to operate some remote devices or equipment. In FIG. 1 the bodily displacement of housing 10 performs useful work such as moving the body 14. Therefore in both forms of the present device a propellant charge is burned to generate pressure in order to perform useful work and the crushing action of the respective pistons on the respective honeycomb units provides a very simple and compact organization for controlling the rate of delivery of the pressurized gas to the place where work is to be performed.

Several embodiments of the present invention have been disclosed and described in the foregoing specification and it should now be appreciated in what manner the invention is intended to function.

What is claimed is:

1. In a propellant actuated device the improvement of a hollow barrel having a closure at one end and provided with vent means therein; a piston member movably mounted in said hollow barrel and normally positioned in spaced relation relative to said closure to define a chamber having said closure as one end and said piston as the opposite end, a source of combustible propellant mounted adjacent said movably mounted piston member; and precrushed collapsible means having an initial length to retain said piston at said opposite end of said hollow chamber, said precrushed means having an initial resistance to collapse at a predetermined value and reacting to the combustion of said propellant to initially resist movement of said piston until the pressure rise from the propellant combustion reaches a substantially uniform pressure level about equal to said predetermined value of initial resistance to collapse, said precrushed collapsible means remaining premanently collapsed upon the completion of the propellant combustion.

2. In a propellant actuated device the improvement of a hollow barrel having a closure at one end provided with vent means, a member movably mounted in said hollow barrel and normally positioned in spaced relation relative to said closure, a source of combustible propellant mounted adjacent said movably mounted member, and a precrushed honeycomb member having a substantially uniform cross section positioned between said movable mounted member and said closure for said hollow barrel, said honeycomb member acting to retain said movably mounted member in its remote location and reacting to the combustion of said propellant to impose an upper limit on the pressure rise in said hollow barrel during propellant combustion.

3. The improvement set forth in claim 2 wherein said precrushed honeycomb member is collapsible at a controlled rate under the force applied by the propellant combustion to said movable member, said honeycomb member remaining permanently collapsed upon the completion of the propellant combustion.

4. In a propellant actuated device the improvement of a hollow barrel having a closure at one end provided with vent means, a member movably mounted in said hollow barrel and normally positioned in spaced relation relative to said closure, said movable member dividing said hollow barrel into a first chamber for receipt of said combustible propellant and a second chamber, a source of combustible propellant mounted adjacent said movably mounted member, said first chamber having vent means for releasing a portion of said combustible propellant outwardly of said hollow barrel, control means positioned in said second chamber between said movably mounted member and said closure for said hollow barrel, and a support structure slidably receiving said hollow barrel and with said hollow barrel defining a check chamber to receive the propellant charge released by said second mentioned vent means, the released propellant charge snubbing relative sliding movement of said support structure and said hollow barrel, and said control means acting to retain said movably mounted member in its remote location and reacting to the combustion of said propellant to impose an upper limit on the pressure rise in said hollow barrel during propellant combustion.

5. In a propellant actuated device the combination of a housing having a closed end formed with bleed holes open to the outside, piston means in said housing spaced from said closed end, a source of gas connected into said housing adjacent said piston means, control means in said housing between said closed end and said piston means, said control means including a crushable member characterized by a predetermined force of crushing and disposed in said housing against said closed end to resist displacement of said piston means, means connected to said gas source to release the same under pressure into said housing against said piston means, and means bleeding-off a portion of the gas under pressure from said piston means, said bleed-off means includes a barrel member slidably receiving said housing and forming a pressurization chamber outside said housing, and orifice means opening between said chamber and the interior of said housing between said piston means and said source of gas.

References Cited

UNITED STATES PATENTS

| | | | |
|---|---|---|---|
| 2,485,394 | 10/1949 | Logan | 60—26.11 X |
| 2,815,008 | 12/1957 | Hirt | 60—26.1 |
| 2,903,849 | 9/1959 | Fawcett et al. | 60—26.1 X |
| 3,263,489 | 8/1966 | Schimmel et al. | 73—35 |
| 3,331,546 | 7/1967 | Brunelle | 227—10 |

CARROLL B. DORITY, Jr., Primary Examiner